US006925469B2

(12) United States Patent
Headings et al.

(10) Patent No.: US 6,925,469 B2
(45) Date of Patent: Aug. 2, 2005

(54) DIGITAL ENTERTAINMENT SERVICE PLATFORM

(75) Inventors: Kevin P. Headings, Pacific Palisades, CA (US); Steven M. Schein, Chino Hills, CA (US)

(73) Assignee: Intertainer, Inc., Santa Monica, CA (US)

( * ) Notice: Subject to any disclaimer, the term of this patent is extended or adjusted under 35 U.S.C. 154(b) by 452 days.

(21) Appl. No.: 09/947,592

(22) Filed: Sep. 5, 2001

(65) Prior Publication Data

US 2002/0143565 A1 Oct. 3, 2002

Related U.S. Application Data

(60) Provisional application No. 60/280,653, filed on Mar. 30, 2001.

(51) Int. Cl.[7] .............................................. G06F 17/30
(52) U.S. Cl. ...................... 707/102; 707/10; 707/104.1; 705/1; 705/17; 705/26; 705/27
(58) Field of Search ...................... 707/10, 102, 104.1; 705/1, 17, 26, 27; 725/1, 104; 380/201; 713/201; 709/229; 379/112.01

(56) References Cited

U.S. PATENT DOCUMENTS

| 5,289,371 A | 2/1994 | Abel et al. |
| 5,307,495 A | 4/1994 | Seino et al. |
| 5,347,632 A | 9/1994 | Filepp et al. |
| 5,408,630 A | 4/1995 | Moss |
| 5,446,919 A | 8/1995 | Wilkins |
| 5,539,450 A | 7/1996 | Handelman |
| 5,553,281 A | 9/1996 | Brown et al. |
| 5,584,025 A | 12/1996 | Keithley et al. |
| 5,636,346 A | 6/1997 | Saxe |
| 5,696,965 A | 12/1997 | Dedrick |
| 5,710,884 A | 1/1998 | Dedrick |
| 5,710,887 A | 1/1998 | Chelliah et al. |
| 5,729,594 A | 3/1998 | Klingman |
| 5,767,845 A | 6/1998 | Oashi et al. |
| 5,790,426 A | 8/1998 | Robinson |
| 5,815,665 A * | 9/1998 | Teper et al. ................. 709/229 |
| 5,825,876 A | 10/1998 | Peterson, Jr. |
| 5,848,396 A | 12/1998 | Gerace |
| 5,864,823 A | 1/1999 | Levitan |
| 5,864,871 A | 1/1999 | Kitain et al. |
| 5,918,014 A | 6/1999 | Robinson |
| 5,933,811 A | 8/1999 | Angles et al. |
| 5,956,693 A | 9/1999 | Geerlings |
| 5,956,700 A | 9/1999 | Landry |
| 5,966,440 A | 10/1999 | Hair |
| 5,973,683 A | 10/1999 | Cragun et al. |
| 5,974,396 A | 10/1999 | Anderson et al. |
| 6,009,407 A | 12/1999 | Garg |
| 6,011,537 A | 1/2000 | Slotznick |
| 6,058,424 A | 5/2000 | Dixon et al. |
| 6,094,677 A | 7/2000 | Capek et al. |

(Continued)

FOREIGN PATENT DOCUMENTS

WO    WO 01/61592 A1 *  8/2001  .......... G06F/17/60

*Primary Examiner*—Frantz Coby
(74) *Attorney, Agent, or Firm*—Martin & Ferraro, LLP (57) ABSTRACT

The present invention is directed to an open business platform that provides an end-to-end solution for managing, distributing, and/or retailing digital media assets from various content suppliers. In one or more embodiments, the present invention provides an integrated system that permits media content suppliers to deposit their media assets with the system where they are prepared by a content management system for distribution to consumers via a secure distribution system. The media content suppliers may then track and-control the use of their media assets through a subscriber management system for managing consumer accounts, a licensing server for issuing licenses restricting the use of media content, and a royalty reporter for determining and reporting royalties to the various content suppliers.

47 Claims, 5 Drawing Sheets

U.S. PATENT DOCUMENTS

| | | | |
|---|---|---|---|
| 6,134,593 A * | 10/2000 | Alexander et al. | 709/229 |
| 6,157,929 A | 12/2000 | Zamiska et al. | |
| 6,163,795 A | 12/2000 | Kikinis | |
| 6,185,541 B1 | 2/2001 | Scroggie et al. | |
| 6,189,008 B1 | 2/2001 | Easty et al. | |
| 6,226,618 B1 | 5/2001 | Downs et al. | |
| 6,314,451 B1 | 11/2001 | Landsman et al. | |
| 6,317,780 B1 | 11/2001 | Cohn et al. | |
| 6,334,116 B1 | 12/2001 | Ganesan et al. | |
| 6,337,901 B1 * | 1/2002 | Rome et al. | 379/112.01 |
| 6,338,094 B1 | 1/2002 | Scott et al. | |
| 6,381,747 B1 * | 4/2002 | Wonfor et al. | 725/104 |
| 6,389,403 B1 | 5/2002 | Dorak, Jr. | |
| 6,615,251 B1 | 9/2003 | Klug et al. | |
| 2002/0016736 A1 | 2/2002 | Cannon et al. | |
| 2002/0059574 A1 * | 5/2002 | Tudor et al. | 725/1 |
| 2002/0062393 A1 | 5/2002 | Borger et al. | |
| 2002/0095606 A1 * | 7/2002 | Carlton | 713/201 |
| 2002/0172362 A1 * | 11/2002 | Wonfor et al. | 380/201 |
| 2003/0014328 A1 * | 1/2003 | Lindner | 705/26 |
| 2003/0120549 A1 * | 6/2003 | Lindner | 705/17 |
| 2003/0120557 A1 * | 6/2003 | Evans et al. | 705/26 |
| 2003/0126033 A1 * | 7/2003 | Evans et al. | 705/26 |
| 2004/0002903 A1 * | 1/2004 | Stolfo et al. | 705/26 |

* cited by examiner

DIGITAL ENTERTAINMENT SERVICE PLATFORM

RELATED APPLICATION

This application claims the benefit of U.S. Provisional Application No. 60/280,653, filed Mar. 30, 2001, incorporated by reference herein.

BACKGROUND

The digitization of media content (e.g., movies, music videos, educational content, television shows, live events, advertising, literary works, audio programs, and other media assets) is becoming more and more common with the advent of technology that allows content suppliers to derive revenues from these assets in a digital marketplace. There is a cost for entry into the digital space that requires infrastructure and processes to effectively manage and distribute various forms of media content, particularly over high bandwidth channels of communication (e.g., digital cable, Internet protocol, and satellite). Content suppliers are not traditionally equipped to handle these requirements. They would benefit from a platform and service offering that removes the barrier to entry into the digital marketplace.

There is also a problem on the content user side. For purposes hereof, a "content user" is any person or entity that sells or otherwise exploits media content. A content user may be, for example, the content supplier, a digital services platform operator, an online site builder, an educational institution, application service provider, or a retailer. One issue facing content users is that consumers want to enter online "malls" or stores that allow them to browse and purchase a wide variety of content choices. This presents unique challenges to content users wishing to develop and sell compelling digital services to these consumers. For example, consumers are used to contemporary brick and mortar stores that allow them to browse and purchase from a fully "aggregated" content offering (e.g., a record store). This offering is not content supplier specific; rather, it is grouped by genres and aisles that make sense to the consumer. In short, a consumer looking for music content does not browse the "Brand X" aisle looking for "Brand X" content offerings; instead they browse "New Releases" and "Rock." Consumers expect an aggregated content set. For purposes hereof, "consumers" are people who view, listen, or otherwise interact with the media content (e.g., people watching television).

This consumer expectation is a problem for online site builders, for example, in that an online site dedicated to the sale of movies or music must be content rich and diverse. It must attempt to emulate the brick and mortar equivalent that consumers use today. While many content owners are looking to build an online entertainment site that is branded and full of their content, such sites are fundamentally too abstract, segmented, and potentially uninteresting to online consumers.

In addition, many content suppliers are not skilled in the art of digitizing and managing content for diverse digital service platforms (e.g., cable set-top box and satellite platforms). Traditional brick and mortar establishments typically do not sell media content in digital form and have not dealt with issues such as encoding, encryption and license tracking. Other issues regarding media content distribution, such as streaming and digital downloading, also provide significant barriers to entry for content suppliers not adept at delivering media content electronically to the consumer.

Finally, the aggregation of compelling and diverse media content often requires licenses from numerous content suppliers who impose restrictions on the use of their media content. The ability to individually manage each media asset from each content supplier in accordance with their varying restrictions and requirements can also be a daunting task for many content users. In view of the foregoing, there is a need for a digital service platform that offers a wide variety of content to a consumer and provides an end-to-end solution for managing media content (including advertising and e-commerce), providing enhanced content-related services (e.g., digital rights management (DRM)), collecting consumer information (e.g., billing), and electronically delivering the content to a content user or consumer.

SUMMARY OF THE INVENTION

The present invention is directed to an open business platform that provides an end-to-end solution for managing, distributing, and/or retailing digital media assets from various content suppliers. Users of this business platform may include content suppliers and other content users. For purposes hereof, "content suppliers" may include entities that own the content, have rights to the content, or are otherwise suppliers of the content.

The present invention provides content suppliers with a digital service platform for remotely depositing its media assets, managing its media assets using business rules to control the distribution of and revenue generated from the media assets, and tracking consumer usage of its media assets to assist in consumer marketing decisions. Providers of digital services (such as multiple cable system operators (MSOs) or website operators; also referred to herein as "content users") seek to offer their customers a wide variety of compelling and diverse content. Because the present invention is an open platform designed to support multiple content suppliers, it allows consumers to access content in an aggregated manner similar to that of a traditional brick and mortar store. The present invention provides these content users with an integrated platform for managing and distributing such content to consumers. The present invention further enables the content user to offer consumers content choices grouped by understandable and desirable genres and categories. For example, the "New Releases" section of an online site could contain titles from all the major movie studios, not just a subset specific to one or two movie studios owning the content. Moreover, the present invention can support channels (e.g., Disney®, Discovery®) if the content user wishes to enable such groupings.

The features of the present invention may be divided into three functions: Digital Content Services, Platform Operation, and Digital Content Sales. Each of these three functions are discussed in detail below:

(1) Digital Content Services

This is the "supply" side of the platform. Content suppliers look to maximize the return on their media assets and related data. In this context, media assets may include, for example, movies, music videos, television programs, video games, online books, live events, games, educational content, audio programs, or any other category of media assets. Related data may include, for example, content usage databases, merchandising databases, and content metadata.

In a preferred embodiment of the invention, content suppliers can submit a media asset and associated business rules into a safe and secure platform depository and receive periodic royalty payments on that asset in accordance with their business rules. "Business rules" define the parameters (e.g., geographic location, bit rate service, service provider, encryption, price, price range, method of delivery, and time frame available for offering the media content to consumers) for using a particular media asset. For example, business rules for a first-run movie may require the content user to sell the movie at a set price (e.g., $3.95), or a particular price range, or to encrypt the movie, or to digitize the movie at a specific bit rate, or to delivery the movie via streaming or digital downloading over a cable network, but not a DSL network.

(2) Platform Operation

This is the operation and interface of the platform. From an operation perspective, the present invention includes interfaces that allow services provided by the platform to be tuned and maintained (e.g., video on demand (VOD) or ad targeting services). In another aspect, the present invention is a digital entertainment factory. Inputs (assets) into the platform may be combined in the same manner a factory combines raw materials in order to produce a consumer good. For example, a preferred embodiment of a content management system of the platform can combine merchandise databases with movie assets and an electronic commerce fulfillment system to create a new item or output. As used herein, an "item" includes one or more media assets and related metadata and/or other data. In this example, the item is a first-run movie with digital commerce opportunities embedded in the video stream and accessible by the consumer (e.g., using an intuitive point and click). The consumer can then purchase a "hard good" (e.g., a digital video disc (DVD) of the first-run movie) through a user interface of the platform, which includes an electronic commerce fulfillment system to ship the product to the consumer. The platform also preferably includes a subscriber management system for managing consumer accounts, a content distribution system for distributing media content to the consumers, a licensing server for issuing licenses restricting the use of media content, and a royalty reporter for determining and reporting royalties to one or more content suppliers.

(3) Digital Content Sales

In order to be profitable and valuable to potential content suppliers and other content users, it is preferred that the platform support as many separate digital content clients (e.g., websites, set-top boxes) as possible. These clients can be owned and operated by any entity wanting to make digital content sales or otherwise distribute content directly to a consumer. In a preferred embodiment, one or more clients may be owned by a media content retailer.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE PREFERRED EMBODIMENTS

Reference will now be made in detail to the present preferred embodiments (exemplary embodiments) of the invention, examples of which are illustrated in the accompanying drawings.

Figure 1:
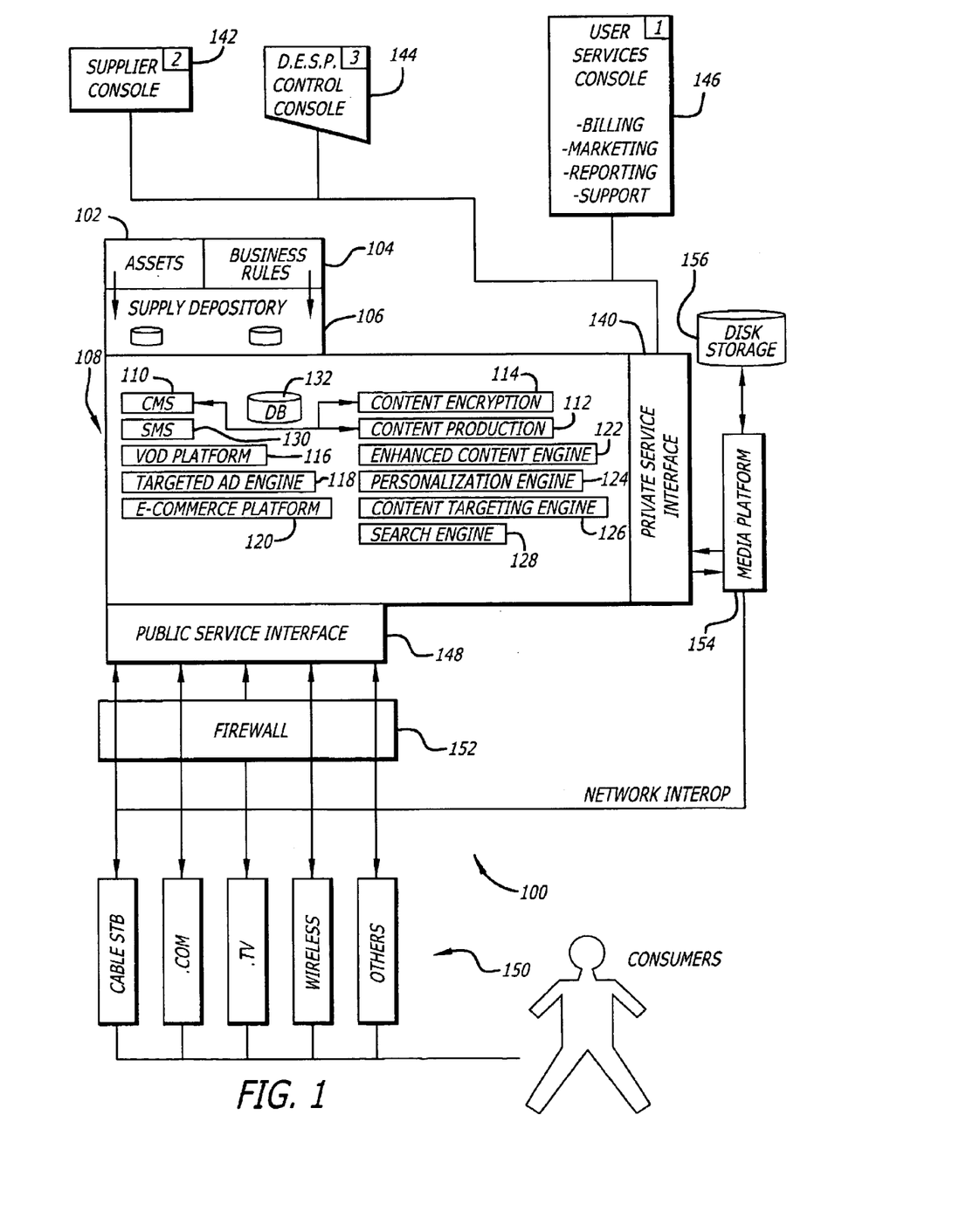
FIG. 1 is a schematic diagram of a preferred embodiment of the invention.

FIG. 1 shows a diagrammatic overview of a digital entertainment service platform (DESP) 100 in accordance with a preferred embodiment of the invention. DESP 100 includes three general functions: Digital Content Services, Platform Operation, and Digital Content Sales. The description of DESP 100 as set forth herein will make reference to each of these general functions.

The Digital Content Services function of DESP 100 generally includes receiving and archiving media assets from a content supplier. Specifically, the Digital Content Services function includes using media assets 102, which are provided by a content supplier to a content user and preferably stored in a supplier asset depository 106 on a service platform 108 (described in detail below). The content supplier may provide media assets 102 on contemporary and standard media sources, for example, Digital Betacam, digital linear tape (DLT), or VHS. Alternatively, the content supplier may deliver media assets 102 electronically using file transfer protocol methods or other known means of delivering digital data. Supplier asset depository 106 may include a vault or other physical storage area for housing "hard" copies of media assets 102 (e.g., VHS tape) or a data storage device (e.g., magnetic or optical disc storage devices) for storing "soft" copies of the media assets 102 (e.g., electronic data files).

The Digital Content Services function preferably includes use of a software-based application for creating and storing business rules 104, which govern how a particular media asset 102 is to be used. In a preferred embodiment, content suppliers can provide business rules for one or more media assets to the content user (e.g., platform operator) through an interface (e.g., website portal) connected to service platform 108. For example, the content user may construct an interface for the content suppliers with defined fields for entering information regarding each media asset or group of media assets. The defined fields may request the content supplier to enter the type of media being deposited (e.g., first-run movie), the service platform for distributing the media asset (e.g., cable and DSL platform), the level of encryption (e.g., low, medium or high), specific retailers for selling the media asset, and other parameters or information regarding use of the media asset. In addition, the content supplier may provide a content user with related data, which may also be stored along with media assets in supplier asset depository 106.

The content user may create other business rules governing the distribution, marketing, or other use of a media asset. For example, the platform operator may impose business rules on whether a particular media asset is enhanced for interactivity or combined with an electronic commerce fulfillment system (e.g., to sell merchandise related to the media asset). Finally, content users may also provide business rules to govern the distribution of content to particular clients.

The Platform Operation function of DESP 100 prepares media assets 102 and business rules 104 for distribution to clients and, preferably, includes use of service platform 108, a private service interface 140 for facilitating communication between service platform 108 and content users, a supplier console 142 for permitting content suppliers to access service platform 108, a DESP control console 144 for permitting the platform operator to access service platform 108, a user services console 146 for permitting content users to access service platform 108, and a public service interface 148 for facilitating communication between service platform 108 and a variety of client platforms.

Service platform 108 is preferably a server-based platform having a processor operable to perform a variety of functions such as receiving, storing, and preparing media assets 102 for distribution to consumers in accordance with business rules 104. In addition to media assets 102, business rules 104, and supplier asset depository 106, service platform 108 preferably includes a content management system 110, a content production application 112, a content encryption application 114, a VOD platform 116, a target advertising engine 118, an e-commerce platform 120, an enhanced content engine 122, a personalization engine 124, a content targeting engine 126, a search engine 128, a subscriber management system 130, and a database 132. A preferred example of a system architecture of a service platform operable with the present invention is taught in U.S. Application Serial No. (to be assigned), titled "Systems and Methods for Delivering Media Content," filed Aug. 7, 2001, which claims priority to U.S. application Ser. No. 60/255,725, the disclosures of which are hereby incorporated by reference herein.

Content management 110 is a software-based application preferably run on service platform 108 and used to manage the preparation, programming, and distribution of media assets 102. Specifically, content management 110 automates the content management workflow, from receipt of media assets 102 and related data, through encoding, quality control, data entry and release of content to the field. Initially, media assets 102 are encoded (i.e., converted from analog to digital form) at one or more bit-rates, which may be specified by business rules 104.

Content production application 112 is a software-based application that may be utilized by content management system 110 to associate media assets 102 with, for example, metadata, related data, and retail information. Metadata may include such descriptive information like copyright information, titles, authors, and abstracts. In addition, content production application 112 may associate certain data with a media asset to create intelligent media. "Intelligent media" is content that includes coded information regarding the use of the content for tracking or targeting purposes. The data content production application 112 uses to create intelligent media may include license tracking information, which may be used to define a license period during which the content may be distributed by the content user; links to related content; associated "hard" goods for e-commerce; targeting information to target the media assets to a particular user demographic; advertising information to associate one or more advertisements with the media asset; and any other data which may be associated with a particular media asset. A preferred example of creating and using intelligent media may be found in U.S. patent application Ser. No. 09/605,695, titled "Intelligent Media Targeting System and Method," the disclosure of which is hereby incorporated by reference herein.

After content production 112, media assets 102 may be encrypted using a desired encryption process 114 (e.g., digital rights management) and stored in a designated location (e.g., supplier asset depository 106 or database 132). A single media asset 102 may be processed though content management multiple times to yield different forms of that media asset (e.g., the media may be encoded at multiple bit-rates and have different business rules). Accordingly, media assets, business rules, and related metadata are indexed and stored in content management system 110 or other designated area (e.g., database 132).

One preferred application of content management system 110 is the unique identification and naming of media assets, business rules, and related metadata, which are bundled to create an "item" and ultimately distributed by the content user. An item is created using an interface of content management system 110. The interface permits an operator to view and manipulate items within content management system 110. Another feature of content management system 110 is the classification and grouping of items into genres and channels commonly known by the content user (e.g., genre-movies; channel-comedy). In a preferred embodiment, these genres and channels may be offered to one or more content users by publishing the genres and channels and associated items to media services server 154. Alternatively, the genres and channels and associated items may be published directly to the content user (e.g., to MSO locations). The genres and channels may be updated periodically as specified by the platform operator (or content user). A preferred example of a content management system operable with the present invention is taught in U.S. application Ser. No. 09/921,100, titled "Content Management System," the disclosure of which is hereby incorporated by reference herein.

VOD Platform 116 is a software-based application that enables pay-per-view purchases of video content via, for example, streaming or digital downloading and provides full video cassette recorder (VCR) functionality (e.g., fast forward, rewind, pause, stop, and play). Targeted advertising engine 118 is a software-based application that enables targeting of advertisements based on specified criteria, including consumer demographics, time, geographic location and the user interface screen the consumer is currently viewing (or has viewed) on the entertainment service delivered over DESP 100. E-commerce platform 120 preferably delivers e-commerce as it relates to specific content or genre of content, enhancing the consumer's experience. For example, a consumer watching a music video can instantly select to purchase (e.g., using a mouse click) the related compact disc or other associated merchandise.

Enhanced content engine 122 enables full motion video interactivity to enhance viewing experience and prompt purchases. For example, an end user can click on an advertisement to interact with a brand, request more information about a service, or purchase the product instantly. A preferred example of enabling full motion interactivity may be found in U.S. application Ser. No. 09/921,097, titled "A System and Method for Interactive Video Content Programming," the disclosure of which is hereby incorporated by reference herein.

Personalization engine 124 is a software-based application that allows service platform 108 to personalize a consumer's experience based, for example, on that consumer's preferences or their interaction with the service. For example, using collaborative filtering, service platform 108 can recommend item choices that would be of interest to a consumer based on that consumer's demographics, purchasing habits, and other characteristics unique to that consumer. Content targeting engine 126 is a software-based application that allows targeted content to be "pushed" or delivered to content users as appropriate. Search engine 128 is a software-based application that enables searching of data stored on service platform 108.

Subscriber management system 130 is a software-based application that administers consumer or subscriber information and provides customer service and support with information and tools necessary to respond to questions or problems surrounding consumer purchases. In addition, subscriber management system 130 collects consumer usage information for reporting (e.g., to content suppliers or clients) and analysis. Subscriber management system 130 further provides user account management functionality. For example, consumers can typically set-up their user accounts online when they first register to use the entertainment service delivered by DESP 100. Subscriber management system 130 permits the consumers to access or modify their accounts online (e.g., to check their statement or update their address or credit card information) without any customer service intervention.

Subscriber management system 130 further supports credit card billing for purchases of content or hard goods by a consumer by capturing the consumer's credit card information and forwarding that information electronically to a credit card processing entity (e.g., a fulfillment partner or bank). A customer support group may also use subscriber management system 130 to manage customer service problems and generate customer service reports. Media content usage may be tracked by subscriber management system 130 to capture, for example, the type of content a consumer views or listens to, what hard goods the consumer buys, the number and type of advertisements the consumer has viewed or listened to, and how long the consumer uses the entertainment service per day or week. This information permits subscriber management system 130 to generate royalty reports for content suppliers.

A preferred service offered by the subscriber management system 130 is its ability to group consumers into service groups and publishing groups for targeted advertisement. A service group is defined as a grouping of consumers that receive services from the same service platform. Placement of a consumer in a service group may depend on parameters related to the distribution of the media asset and may include any one of or any combination of a client service platform for distributing the media asset (e.g., wireless, DSL, the Internet, satellite, or cable), encryption, specific retailers for selling or licensing the media asset(s), a geographical location, a level of service or bit rate, service provider, and a method of delivery (e.g., streaming or digital download). The grouping of consumers into service groups facilitates targeting media content having contractual obligations or business rules associated therewith. Each service provider, for example a client, may cater to a plurality of service groups and publication groups.

A publishing group is defined as a logical grouping of consumers that are related to a specific provider for the purpose of targeting media content. Different media content offerings can be targeted to different publishing groups concurrently, allowing for different sets of content to be available to each publishing group. For example, localized content, such as but not limited to news or sports features, can be presented to their local markets. Publishing groups may be used to group consumers into consumer groupings to perform further targeting such as localized, precision marketing. The targeted marketing may be directed to different geographically located consumers and/or, based on other consumer-related information such as any one of or a combination of demographics (e.g., gender, income and/or age), content usage (e.g., the amount of time the media content was viewed or listened to, consumer viewing or listening habits, and consumer preferences for different types or genres of media content), and parental controls. Content usage may be determined from analyzing data contained in a consumer research database, which may be located on service platform 108. Placement of a consumer in a particular publishing group will allow a client to specifically target a consumer based on the aforementioned characteristics. A preferred example of a subscriber management system operable with the present invention is taught in U.S. application Ser. No. 09/921,107, titled "Subscriber Management System," the disclosure of which is hereby incorporated by reference herein.

Service platform 108 preferably includes a private service interface 140 and a public service interface 148. Private service interface 140 is preferably a server-based interface to facilitate communication between service platform 108 and enterprise software applications used by the platform. Preferably, these applications are included on a supplier console 142, a DESP control console 144, and a user services console 146.

Supplier console 142 is preferably a software-based device (e.g., computer) that is operable to run an enterprise software application permitting a content supplier to remotely deposit its media assets, manage its media assets using business rules to control the distribution of and revenue generated from the media assets, and track consumer usage of its media assets to assist in consumer marketing decisions. Through supplier console 142, content suppliers may access information collected by service platform 108 relating to its media assets and other associated materials. This information may include content usage information such as the number of times a consumer has viewed its media assets or purchased its products, as well as content distribution and royalty reports. The content supplier may also use supplier console 142 to create or supply business rules for association with one or more media assets supplied. The content supplier may be provided with a user name and a unique password to access the information on service platform 108. Service platform 108 would then only provide information directly related to the media assets of the requesting content supplier. This procedure ensures that each content supplier's information is kept private from other content suppliers. The enterprise software application is preferably installed at the content supplier's location to facilitate the remote communication between the content supplier and platform 108 and may include security enhancements (e.g., encryption) to permit the content supplier to securely transfer media assets for deposit into supply depository 106 and retrieve information from platform 108. The enterprise software application used by supplier console 142 preferably uses a graphic user interface to access platform 108 through private service interface 140.

DESP control console 144 is a software-based device (e.g., a computer) that is operable to run enterprise software adapted to permit the platform operator to configure service platform 108 on a real-time basis. For example, using DESP control console 144, the platform operator may add or modify content users, content supplier business rules, content user services, and perform platform specific configuration (e.g., increase or decrease server allocated resources). In addition, a platform operator may remove a sale item from a particular retail client platform using DESP control console 144, all in real-time. DESP control console 144 may also be used to troubleshoot (or assist in troubleshooting) problems found on service platform 108.

User services console 146 is a software-based device (e.g., computer) that is operable to run enterprise software adapted to permit selected entities (e.g., content user) to manage services, such as billing, marketing, reporting, and support. A selected entity may include a content supplier, client, MSO, network operator, retail site operator or any other content user, entity or person that has a stake or interest in services provided by DESP 100. Using user services console 146, the content user may extract billing information from service platform 108. In addition, the content user can generate marketing and royalty reports for each content supplier, for example, that indicates how the content supplier's media assets have performed on the entertainment service and the amount of royalties due content supplier for use of those media assets. Other stakeholder-related services may also be managed using user services console 146. For example, user services console 146 may generate an interface that allows content suppliers to enter information into defined fields regarding each media asset or group of media assets as already described above in relation to the digital content services function.

The enterprise software application of user services console 146 is preferably installed at the content user's location to facilitate the remote communication between the content user and platform 108 and may include security enhancements (e.g., encryption) to permit the content user to securely retrieve information from platform 108. The enterprise software application used by user services console 146 also preferably uses a graphic user interface to access platform 108 through private service interface 140.

It will be appreciated that private service interface 140 may be adapted to function as a web portal and be operable to generate a graphic user interface accessible from virtually any location without the use of particular enterprise software. Content suppliers and other content users may then retrieve information without being restricted to a particular computer. It will be further appreciated that the functionality of supplier console 142 and user services console 146 may be accessed through a single graphic user interface that may be programmed to offer a "supplier's only" menu option leading to web pages geared only toward content suppliers.

Public service interface 148 is preferably a server-based interface to facilitate communication between service platform 108 and various client platforms 150, for example, cable set top boxes, Internet websites (e.g., low bandwidth and high bandwidth websites), wireless systems (e.g., direct broadcast satellite (DBS)), land-based digital cell phone technology, and any other existing or future system or network capable of delivering digital information. A particular advantage of public service interface 148 is its ability to be programmed to adapt to a variety of client platform interfaces. This feature allows service platform 108 to communicate with each client platform regardless of the communication protocol used by such client platform (e.g., internet protocol). A firewall 152 may be used between service platform 108 and client platforms 150 to prevent unauthorized access to or from service platform 108. Client platforms 150 are preferably used in the Digital Content Sales function of DESP 100 and distribute entertainment services from DESP 100 directly to the consumer.

While service platform 108 provides services and data to client platforms 150, media assets are preferably distributed through a media services platform 154, which is a server-based platform that includes a database 156 for storing media assets. In a preferred embodiment, media platform 154 includes servers that are located in geographical areas close to the consumer to minimize degradation of content quality during delivery. Alternatively, media platform 154 may include servers irrespective of geographic location where broadband quality access is available between the servers and a wide geographic area or region. Media platform 154 communicates with service platform 108 via private interface 140 to send and receive instructions and other information regarding the distribution of media assets to a client. For example, if service platform 108 receives an instruction to stop streaming a certain movie to a particular client and/or consumer from DESP control console 144, that instruction is communicated to media platform 154 and media platform 154 ceases to deliver that movie to that client and/or consumer.

The method of delivery for media platform 154 may be done in a number of known ways, for example, streaming and/or digitally downloading media over a local service provider's broadband network. Media may be streamed, for example, into a portion of the client's graphic user interface, or through the screen of the client's web page. A preferred example of a media delivery system operable with the present invention is taught in U.S. application Ser. No. 09/921,096, titled "Content Distribution System," the disclosure of which is hereby incorporated by reference herein.

Figure 2:
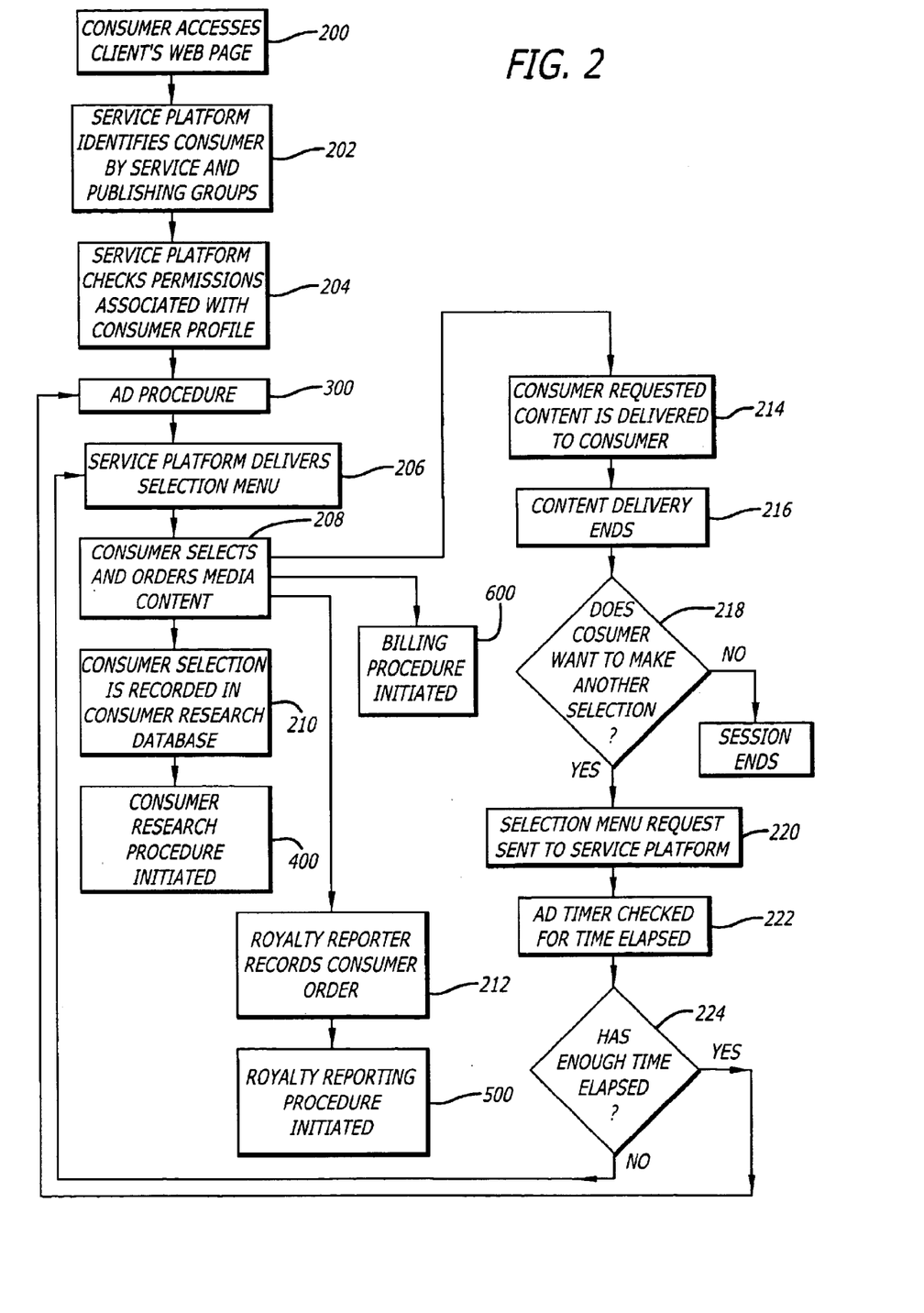
FIG. 2 is a logic diagram of a preferred method for ordering media content.

FIG. 2 shows a preferred method for ordering a media asset on DESP 100. In step 200, a consumer accesses the client's system (e.g., through a web page or cable channel). In step 202, service platform 108 identifies the consumer by service and publishing groups. In step 204, service platform 108 checks the permissions (if any) associated with the consumer profile (e.g., whether the consumer has been authorized by a parent or guardian to view the requested media asset). In a preferred embodiment, an ad procedure is then initiated in step 300.

Figure 3:
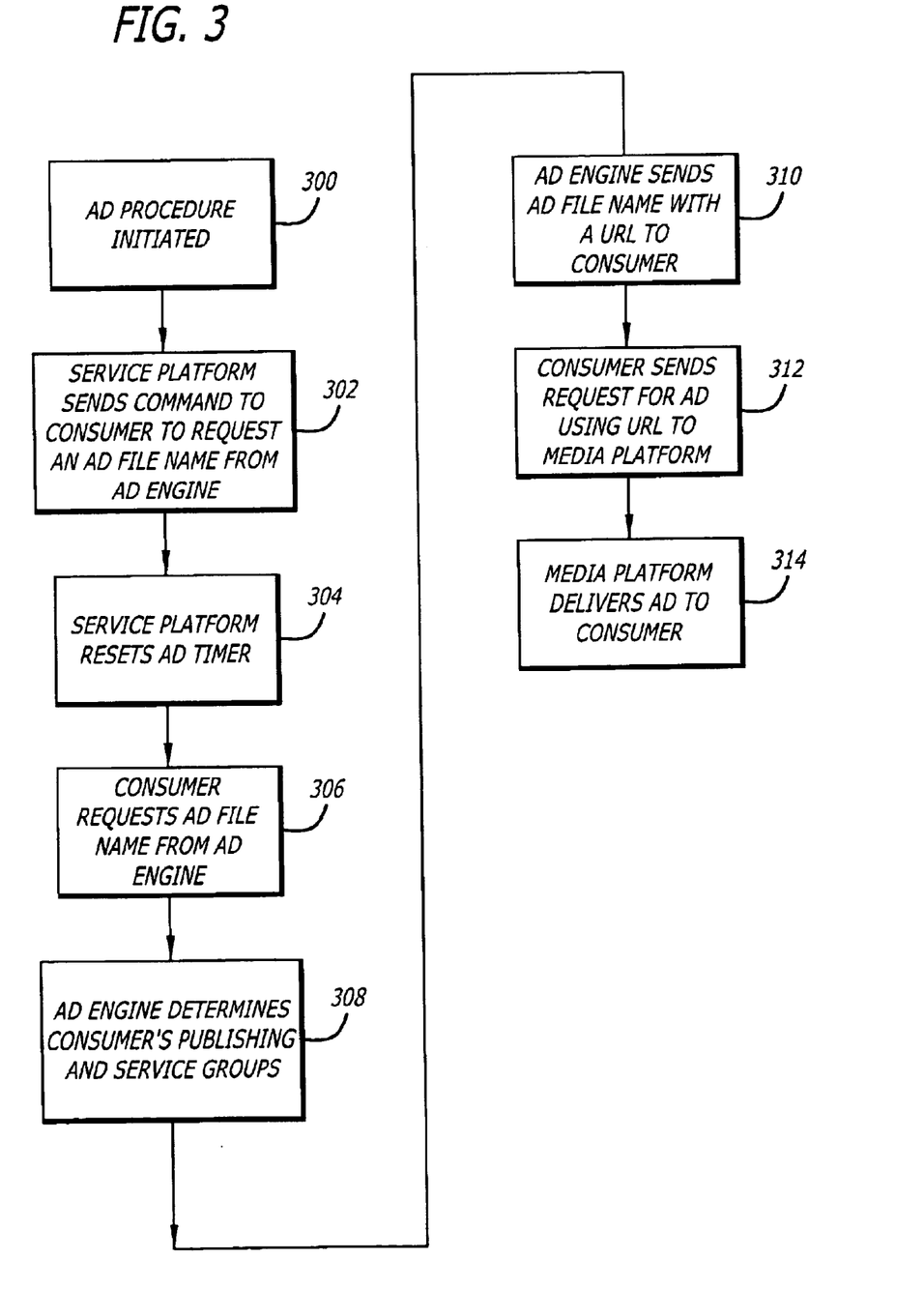
FIG. 3 is a logic diagram of a preferred advertising method for use with the method of FIG. 2.

As shown in FIG. 3, ad procedure 300 is commenced when the consumer or the consumer's visual display (e.g., computer, television set, or other audio-visual device) requests an ad file from ad engine 118 in step 302. The ad engine preferably includes a database of file names of ads to be targeted to specific publishing groups of consumers. In step 304, service platform 108 resets an ad timer, preferably included as part of ad engine 118. The ad timer preferably times consumer interaction rather than a particular content. In step 306, the consumer's visual display requests the ad file name from the ad engine. In step 308, the ad engine determines the consumer's publishing group and service group (e.g., bit rate service requirement) by accessing a database shared by the subscriber management system. In step 310, the ad engine sends the ad file name to the consumer's visual display. Thereafter, the consumer's visual display sends the request for an ad using a universal resource locator (URL) to media platform 154 in step 312. A media server in step 314 delivers the ad to the consumer, thus completing an ad procedure. During the ad procedure, it is understood that one or more steps may be interchanged with others or omitted. For example, step 304, resetting the ad timer, may be accomplished anywhere during the ad procedure.

A preferred example of an ad procedure operable with the present invention is taught in U.S. application Ser. No. 09/825,758, titled "Internet-Protocol Based Interstitial Advertising," the disclosure of which is hereby incorporated by reference herein. It will be appreciated, however, that ad procedure 300 may be initiated at more than one location in the order of the method, or omitted altogether.

As shown in FIG. 2, service platform 108 delivers a selection menu to the consumer in step 206. In step 208, the consumer selects and orders the media content desired. At this point, a number of events may simultaneously occur. In step 210, the consumer selection is recorded in a consumer research database, which may be located on service platform 108. Thereafter, a consumer research procedure may be initiated in step 400.

Figure 4:
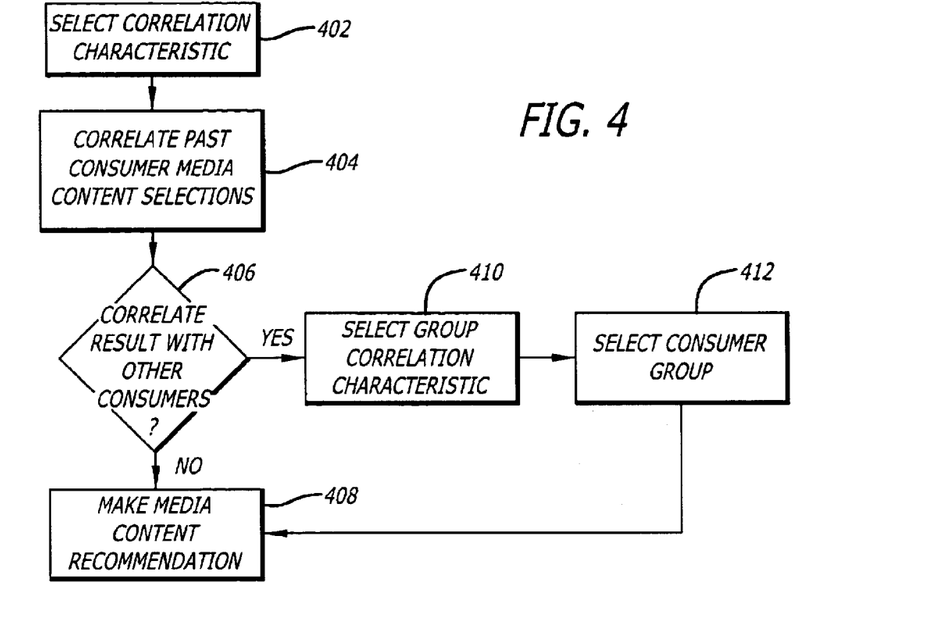
FIG. 4 is a logic diagram of a preferred method of making content recommendations to a consumer for use with the method of FIG. 2.

As shown in FIG. 4, a consumer research procedure may be commenced by any content user to provide information related to the past media content usage of the consumer and make recommendations for additional media content appealing to the consumer. In step 402, a correlation characteristic is selected. Exemplary correlation characteristics may include, though not limited to, media content category or sub-category (e.g., media assets such as movies and audio programs), genre (e.g., romance, adventure), consumer demographics, consumer content usage, parental controls, and geographic location (consumer or provider). In step 404, the past consumer media content selections are correlated based on the correlation characteristic. For example, if a content supplier desires to obtain information regarding a particular consumer's preference among movies and movie actors, correlation characteristics of movies (type) and movie actors may be used to produce a report showing the consumer's preference for science fiction films starring R2D2. This information may be used to target ads or similar films having the same actor to the consumer.

In step 406, an option is provided to correlate the result obtained from step 404 with other consumers. If no further correlations are desired, then the results obtained from step 404 are used to make media content recommendations to the consumer in step 408, preferably as the consumer is selecting media content. Content selections may also be made to content users in addition to or in place of any made to the consumer. If it is desired to correlate the result from step 404 with other consumers, then a group selection correlation characteristic may be selected in step 410. Exemplary group correlation characteristics may include any one or a combination of the characteristics described for use as a correlation characteristic above and applicable to a group of consumers. In step 412, a consumer group is selected. Consumers may be grouped, for example, based on parameters associated with service and publishing groups. A correlation among a particular consumer group may yield information that can be used to target ads and/or other media assets to a group of consumers rather than an individual consumer.

As will be appreciated by those skilled in the art, the above steps need not be performed in the described order. Various steps may be re-ordered or omitted, or new steps added. For example, steps 410 and 412 may be performed without first obtaining a correlation of past consumer media content selections, thereby bypassing steps 402 and 404 altogether. Also, step 408 may be omitted if only a research report is desired.

As shown in FIG. 2, in step 212, service platform 108 records a request or order of the consumer for media assets from DESP 100. Thereafter, in step 500, a royalty reporting procedure is initiated on service platform 108 to track the royalties due to content suppliers for the media assets used by the consumer.

Figure 5:
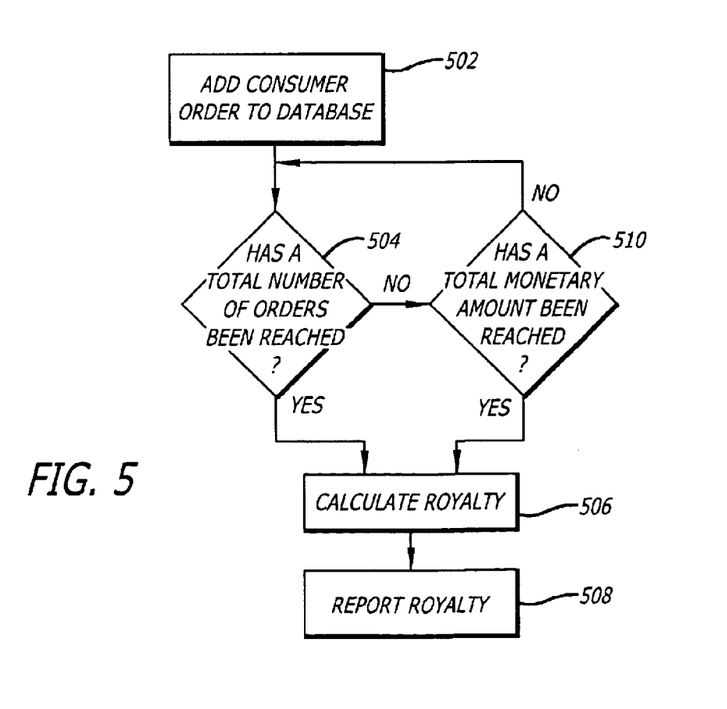
FIG. 5 is a logic diagram of a preferred method of reporting royalties for use with the method of FIG. 2.

As shown in FIG. 5, the consumer order for particular media asset(s) is added to a database adapted to keep a record of orders for media assets in step 502. In step 504, it is determined whether a total number of orders for a particular media asset have reached a selected number. If the total number of orders has reached the selected number, then the amount due to the content supplier for use of the media asset may be calculated in step 506 and included in a report to a content supplier or owner in step 508. For example, a processor may be programmed to calculate and report an amount due to a content supplier based on a royalty for a particular media asset once one hundred orders have been received for that media asset. If the total number of orders has not been reached for the particular media asset, then it is determined whether a specified total monetary amount has been reached in step 510. If the specified total monetary amount has been reached, then steps 506 and 508 are performed. If the specified total monetary amount has not been reached, then steps 504 and 510 are repeated until one of the determinations results in the condition being satisfied.

As will be appreciated by those skilled in the art, the above steps need not be performed in the described order. Various steps may be re-ordered or omitted, or new steps added. For example, steps 504 and 510 may be reversed in order. Alternatively, either step 504 or step 510 may be omitted. Also, either or both of steps 504 and 510 may be based on a media content offering rather than an individual media asset. Therefore, a content supplier or owner may receive royalties based on the total orders and/or total monetary amount associated with their media asset portfolio used by system 100. Another decision step may be added to or replace either or both of steps 504 and 510 to calculate and report royalties based on an interval of time elapsing. For example, royalties for a particular media asset may be reported on a monthly basis to the media content supplier or owner.

Figure 6:
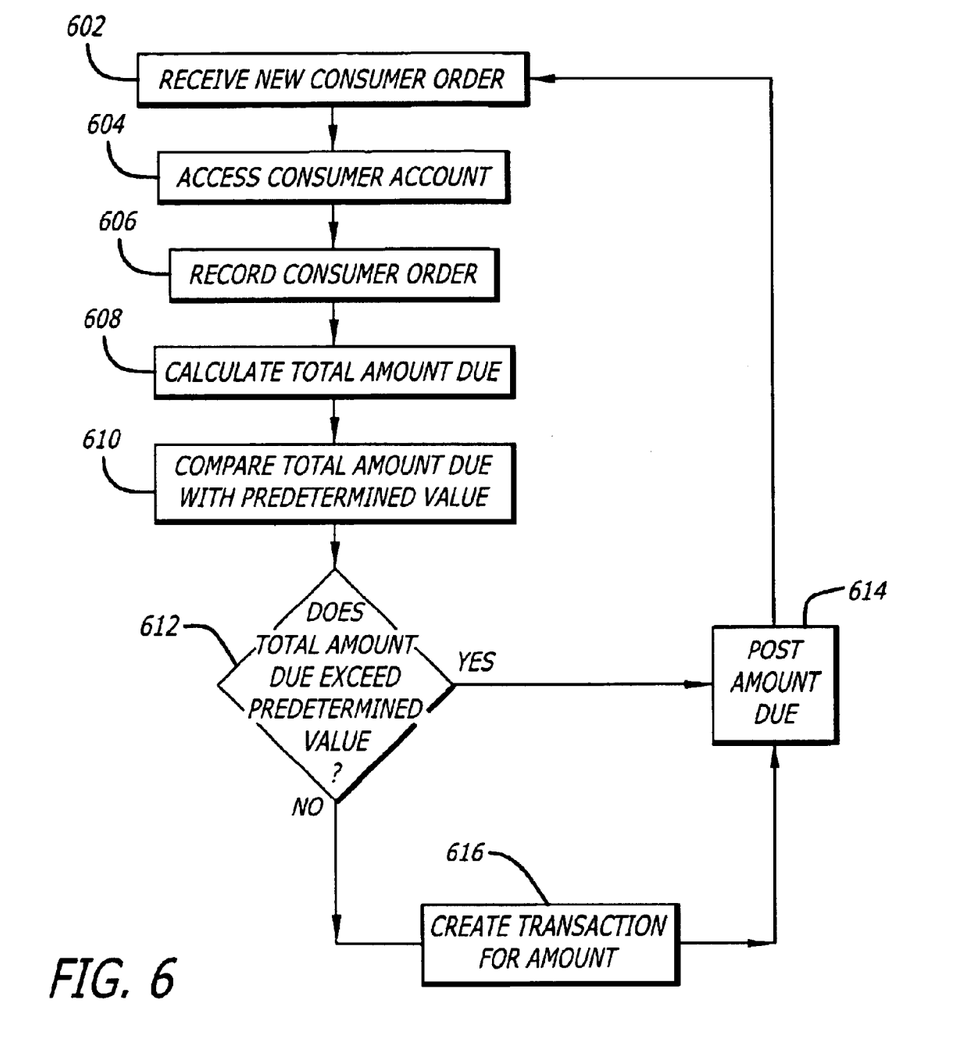
FIG. 6 is a logic diagram of a preferred method for posting an amount due for a consumer account.

As shown in FIG. 2, step 600, a billing procedure is initiated on service platform 108 to charge the consumer's account for any purchases made during their use of the entertainment service provided by DESP 100 (e.g., movie or DVD purchase). As shown in FIG. 6, in step 602, a new consumer order is received. In step 604, the consumer account is accessed. In step 606, the consumer order is recorded. In step 608, the system calculates the total amount due on the consumer account. In step 610, the total amount due is compared with a predetermined value. If the total amount due exceeds the predetermined value in step 612, then the amount due is posted in step 614 using the consumer's pre-selected form of payment, for example, a credit card. In addition, accounts may have a billing cycle. If the total amount due has not reached the predetermined spending limit set by the account holder in a predetermined time frame (e.g., end of the billing cycle) then a transaction is created in step 616 for that amount and the amount due is posted using the consumer's pre-selected form of payment in step 614. For example, the preferred billing procedure of the present invention may post a consumer's total amount due to a credit card if the amount due exceeds $30.00, or if the account has gone more than 30 days without a bill posting.

As will be appreciated by those skilled in the art, the above steps need not be performed in the described order. Various steps may be re-ordered or omitted, or new steps added. For example, a consumer's order may be recorded and billing determinations made before delivery of the consumer order. Alternatively, the consumer may be charged at the point of sale for each purchase made on the service. One skilled in the art will appreciate that there are many commercially known billing procedures that could be used to obtain payment for consumer purchases.

As shown in FIG. 2, in step 214, the consumer-requested content is electronically delivered to the consumer (e.g., using streaming or digital download technology). It should be noted that, while it is preferred that steps 210, 212, 600 and 214, occur simultaneously, these steps may differ in order and timing without departing from the broad scope of the present invention. In step 216, the content delivery ends and the consumer is presented with a decision whether to make another selection in step 218. If the consumer decides not to make another selection, then the session ends. If the consumer decides to make another selection, a selection menu request is sent to service platform 108 in step 220. Next, the ad timer is checked for time elapsed in step 222. At this point, the decision is made whether enough time has elapsed after checking the ad timer by comparing a predetermined time before initiating another ad procedure against the time reported on the ad timer in step 224. If enough time has not elapsed, then service platform 108 delivers a selection menu to the consumer. If, however, enough time has elapsed, then another ad procedure is initiated. It should be understood, however, that an ad procedure is only preferred and not necessary to this method. For example, it is possible that a client or other content user may have their own ad procedure that they wish to incorporate within their system. The present invention, however, gives the client or other content user the option to use an ad procedure integrated with content delivery.

Alternatively, media assets may be offered to the consumer as part of a subscription package, advertising supported package, or other manner based on the preferences of the content supplier and/or client. Service platform 108 may be configured to support one or more business models or other criteria for generating revenue from the media assets.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for managing and marketing digital media content supplied by a plurality of media content suppliers to a plurality of consumers, the system comprising:
    a processor operable to combine media assets supplied by the media content suppliers and metadata to create a media content offering for use by the consumers said processor having a private service interface adapted to permit the media content suppliers to directly access the system to administer the media content offering;
    a database for storing the media content offering;
    a file repository for storing media content associated with the media content offering; and
    a server adapted to distribute media content stored in said file repository.

2. The system of claim 1, wherein the private service interface is adapted to permit the media content suppliers to access information collected by said processor related to the use of media content from the media content offering by at least on of the consumers.

3. The system of claim 2, wherein the information collected includes the number of times a media asset has been used.

4. The system of claim 2, wherein the information collected includes the preferences for each media asset by one or more of the consumers.

5. The system of claim 2, wherein said interface is adapted to permit each of the media content suppliers access to information only related to one or more media assets for which each media content supplier has rights to offer to the consumers.

6. The system of claim 1, wherein said processor is operable to manage consumer-related information, further comprising a database for storing the consumer-related information.

7. The system of claim 6, wherein the consumer-related information includes billing information.

8. The system of claim 6, wherein the consumer-related information includes demographical information.

9. The system of claim 1, wherein said processor is operable to check an accounts database and determine whether the consumer is permitted to use the selected media content.

10. The system of claim 1, wherein said database is adapted to be accessed by a group of the consumers who subscribe to a media content subscription service.

11. The system of claim 1, further comprising a licensing server operable to grant a license to each consumer requesting use of selected media content requiring the license upon a determination that the consumer is permitted to use the selected media content.

12. The system of claim 11, wherein said license includes a decryption key program adapted to decrypt media content that is encrypted.

13. The system of claim 11, wherein said processor is adapted to offer media content to the consumer for a selected interval of time.

14. The system of claim 13, wherein the license permits the consumer to use the selected media content for an interval of time different from the interval of time the media content is being offered.

15. The system of claim 1, further comprising a public service interface adapted to permit communication between said processor and a plurality of different types of client platforms.

16. The system of claim 15, wherein said platforms include any two of cable set top box, Internet web site, direct broadcast satellite, and wireless cell phone.

17. The system of claim 1, wherein said processor is operable to accept media assets remotely deposited by media content suppliers.

18. The system of claim 1, further comprising a content supplier processor operable to run software programmed to generate a graphic user interface for facilitating access by a media content supplier to said private service interface.

19. The system of claim 18, wherein said graphic user interface contains fields for supplying business rules.

20. A method for managing and marketing digital media content supplied by a plurality of media content suppliers to a plurality of consumers, the method comprising the steps of:
    providing the plurality of media content suppliers direct access to a digital media content service platform for permitting the media content suppliers to supply media content to the digital media content platform by electronic transmissions; and
    offering the media content to consumers in accordance with business rules governing the use of the media content.

21. The method of claim 20, further comprising the step of associating metadata with the media content supplied by one of the content suppliers.

22. The method of claim 20, wherein said offering step includes the sub-steps of determining whether a consumer making a request for selected media content is permitted to use the selected media content and issuing a license to the consumer making the request upon a determination that the consumer is permitted to use the selected media content.

23. The method of claim 22, wherein the license issued includes a decryption key program for decrypting media content that is encrypted.

24. The method of claim 22, wherein the license issued expires after a selected interval of time.

25. The method of claim 20, wherein said step of offering the media content includes offering media content that is offered for only a selected interval of time.

26. The method of claim 20, wherein the media content is offered only to consumers of a media content subscription service.

27. The method of claim 20, wherein said step of offering the media content is based at least in part on the demographics associated with the consumers.

28. The method of claim 20, wherein said step of offering the media content is based at least in part on the viewing habits of the consumers.

29. The method of claim 20, wherein the media content is offered over a plurality of different types of client platforms.

30. The method of claim 29, wherein the platforms include any two of cable set top box, Internet web site, direct broadcast satellite, and wireless cell phone.

31. The method of claim 20, further comprising the steps of collecting information related to the use of the media content by the consumers, and providing to at least one of the media content suppliers information related to the use of media content supplied by the media content supplier.

32. The method of claim 31, wherein said providing step includes providing a number of times the media content was requested by consumers.

33. The method of claim 31, further comprising the step of determining an amount due to the content supplier based on information collected in said collecting step.

34. The method of claim 33, wherein said determination step is performed after a selected amount of requests is collected.

35. The method of claim 31, wherein the information includes a number of requests collected during a selected interval of time.

36. The method of claim 31, further comprising the step of providing to at least one content retailer information related to the use of media content supplied by the media content suppliers.

37. The method of claim 20, wherein said step of providing the plurality of media content suppliers access to the digital media content service platform includes the sub-steps of generating a graphic user interface and accepting media assets from the content suppliers through the graphic user interface.

38. The method of claim 20, further comprising the step of storing the media content supplied by the media content suppliers on a database.

39. A method for providing digital media content services to a plurality of media content suppliers, the method comprising the steps of:

providing a digital media content service platform operable to manage and distribute media content to a plurality of consumers in accordance with business rules supplied by media content suppliers; and providing a plurality of media content suppliers access to the digital media content service platform for permitting the media content suppliers to directly supply media content to the digital media content platform by electronic transmission.

40. The method of claim 39, further comprising the step of providing a plurality of media content retailers access to the digital media content service platform.

41. The method of claim 39, further comprising the step of providing the plurality of media content suppliers targeted advertising services.

42. The method of claim 39, further comprising the step of providing the plurality of media content suppliers the services for combining media assets supplied by the media content suppliers with metadata created within the digital media content platform.

43. The method of claim 39, further comprising the step of providing the plurality of media content suppliers services for tracking consumer preferences for media content.

44. The method of claim 39, further comprising the step of providing the plurality of media content suppliers services for encrypting media content.

45. The method of claim 39, further comprising the step of providing the plurality of media content suppliers services for determining an amount due associated with the use of media content supplied by the media content suppliers.

46. The method of claim 39, further comprising the step of providing the plurality of media content suppliers services for distributing media content supplied by the media content suppliers in accordance with business rules provided by the media content suppliers.

47. The system of claim 1, wherein the private service interface is adapted to permit the media content suppliers to supply media content to the system by electronic transmission.

* * * * *

US006925469C1

(12) INTER PARTES REEXAMINATION CERTIFICATE (722nd)

United States Patent
Headings et al.

(10) Number: US 6,925,469 C1
(45) Certificate Issued: Oct. 30, 2013

(54) DIGITAL ENTERTAINMENT SERVICE PLATFORM

(75) Inventors: Kevin P. Headings, Pacific Palisades, CA (US); Steven M. Schein, Chino Hills, CA (US)

(73) Assignee: Intertainer, Inc., Santa Monica, CA (US)

Reexamination Request:
No. 95/000,313, Oct. 31, 2007

Reexamination Certificate for:
Patent No.: 6,925,469
Issued: Aug. 2, 2005
Appl. No.: 09/947,592
Filed: Sep. 5, 2001

Related U.S. Application Data

(60) Provisional application No. 60/280,653, filed on Mar. 30, 2001.

(51) Int. Cl.
*G06Q 10/00* (2012.01)

(52) U.S. Cl.
USPC ...... 705/1.1; 705/17; 705/26.1; 707/999.102; 707/999.01; 707/999.104

(58) Field of Classification Search
None
See application file for complete search history.

(56) References Cited

To view the complete listing of prior art documents cited during the proceeding for Reexamination Control Number 95/000,313, please refer to the USPTO's public Patent Application Information Retrieval (PAIR) system under the Display References tab.

*Primary Examiner* — Fred Ferris (57) ABSTRACT

The present invention is directed to an open business platform that provides an end-to-end solution for managing, distributing, and/or retailing digital media assets from various content suppliers. In one or more embodiments, the present invention provides an integrated system that permits media content suppliers to deposit their media assets with the system where they are prepared by a content management system for distribution to consumers via a secure distribution system. The media content suppliers may then track and-control the use of their media assets through a subscriber management system for managing consumer accounts, a licensing server for issuing licenses restricting the use of media content, and a royalty reporter for determining and reporting royalties to the various content suppliers.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-47 are cancelled.

\* \* \* \* \*